(12) United States Patent
Li et al.

(10) Patent No.: US 11,246,150 B2
(45) Date of Patent: Feb. 8, 2022

(54) UPLINK TRANSMISSION METHOD AND BASE STATION

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 529 days.

(21) Appl. No.: 16/321,473

(22) PCT Filed: Dec. 30, 2016

(86) PCT No.: PCT/CN2016/113650
§ 371 (c)(1),
(2) Date: Jan. 29, 2019

(87) PCT Pub. No.: WO2018/023938
PCT Pub. Date: Feb. 8, 2018

(65) Prior Publication Data
US 2021/0289523 A1    Sep. 16, 2021

(30) Foreign Application Priority Data

Aug. 5, 2016 (CN) .......................... 201610639607.3

(51) Int. Cl.
*H04W 72/14* (2009.01)
*H04W 72/12* (2009.01)
*H04W 72/04* (2009.01)

(52) U.S. Cl.
CPC ... *H04W 72/1268* (2013.01); *H04W 72/0446* (2013.01); *H04W 72/1289* (2013.01); *H04W 72/14* (2013.01)

(58) Field of Classification Search
CPC ......... H04W 72/1268; H04W 72/1289; H04W 72/14; H04W 72/0446
See application file for complete search history.

(56) References Cited

U.S. PATENT DOCUMENTS

| 2016/0119948 | A1   | 4/2016 | Damnjanovic et al. |
| 2016/0128095 | A1 * | 5/2016 | Damnjanovic ....... H04L 5/0092 370/336 |
| 2017/0048886 | A1 * | 2/2017 | Sun ........................ H04L 5/0053 |

FOREIGN PATENT DOCUMENTS

| CN | 104468030 A | 3/2015 |
| CN | 106102180 A | 11/2016 |

OTHER PUBLICATIONS

"Overview of 5G frame structure", 3GPP TSG RAN WG1 Meeting #84bis R1-162157, Busan, Korea, Apr. 11-15, 2016.

* cited by examiner

*Primary Examiner* — Lan-Huong Truong
(74) *Attorney, Agent, or Firm* — ScienBiziP, P.C.

(57) ABSTRACT

An uplink transmission method and a base station are provided The method includes: determining, by the base station, a time length of a single transmission time interval t and a time delay correction value k corresponding to a service type; sending uplink grant signaling to a terminal, and indicating uplink transmission information of uplink data in the uplink grant signaling; informing the terminal of duration information of the single transmission time interval t, information of the time delay correction value k and the uplink transmission information; receiving the uplink data transmitted by the terminal according to the duration infor- (Continued)

mation of the single transmission time interval t, the information of the time delay correction value k and the uplink transmission information, to implement an uplink transmission. The technical solution is beneficial for the base station to adjust the uplink scheduling delay, to satisfy the diversified requirements in the future 5G services.

20 Claims, 5 Drawing Sheets

UPLINK TRANSMISSION METHOD AND BASE STATION

CROSS-REFERENCE TO RELATED APPLICATIONS

The application claims a priority of Chinese Patent Application No. 201610639607.3, entitled "Uplink Transmission Method and Base Station," filed on Aug. 5, 2016 in the China National Intellectual Property Administration (CNIPA), the entire contents of which are incorporated by reference herein.

FIELD

The embodiments of the present disclosure relate to technical fields of communications, specifically an uplink transmission method and a base station.

BACKGROUND

With a rapid improvement of communication requirements of users, communication traffic is in explosive growth, resource scheduling granularities and processing time delays of the Long Term Evolution (LTE) and Long Term Evolution-Advanced (LTE-A) are falling below requirements of the users. Specifically, in the existing 4G and 4.5G mobile communication technologies, both of them are implemented based on a unit time length in the LTE and LTE-A wireless access technology. The size of the unit time length is usually fixed, for example, the unit time length is usually a sub-frame, and the time length of the sub-frame is 1 ms in the LTE technology, therefore, Transmission Time Interval (TTI) that is the time length of a unit time length is 1 ms in the LTE technology. In the prior art, when a base station performs uplink scheduling, the time interval of uplink sending uplink (UL) grant signaling and starting the transmission of the uplink data generally need to be after 4 TTIs, that is, the uplink scheduling delay is generally larger than or equal to 4 ms. Therefore, the scheduling time delay cannot meet time delay diversified requirements of 5G services. in the future.

The future 5G service can include the following three types of services, such as enhanced Mobile BroadBand (eMBB) service, Ultra-Reliable and Low Latency Communications (URLLC) service and massive Machine Type Communications (mMTC) services. The time delay requirements of the three types of services are different. For example, for the eMBB service, two main indicators are high bandwidth and low time delay, and the time delay requires 4 ms. For the URLLC service, the time delay requires 0.5 ms. The mMTC service requires a narrow-band service and a long-life battery, and the service requires a frequency domain with a smaller granularity and a time domain resource with a wider granularity, thus the time delay requirement is relatively low. The existing fixed and large-value time delay does not meet the requirements of 5G services.

SUMMARY

To solve technical problems, the present disclosure provides an uplink transmission method and a base station. The uplink scheduling time delay can be adjusted according to service types, and the diversified requirements of the future 5G service can be satisfied.

In order to solve the technical problem, a first aspect of the present disclosure provides an uplink transmission method, which includes:

Determining a time length of a single transmission time interval t and a time delay correction value k corresponding to a service type by the base station, according to a transmitted service type, t being equal to $2^n*5^m$ is, in and n being integers, and k being an integer that is larger than or equal to $-4$;

Sending uplink (UL) grant signaling to a terminal, and indicating uplink transmission information of uplink data in the UL grant signaling the uplink transmission information including time for sending the uplink data the first time and a number of time for sending the uplink data, or the uplink transmission information including the time for sending the uplink data for the first time, the number of time for sending the uplink data and a time interval between every two times for sending the uplink data.

Informing the terminal of duration information of the single transmission time interval t, information of the time delay correction value k and the uplink transmission information;

Receiving the uplink data transmitted by the terminal according to the duration information of the single transmission time interval t, the information of the time delay correction value k and the uplink transmission information, to implement an uplink transmission.

When the service type is a Long Term Evolution (LTE) service using a licensed frequency spectrum, a first uplink scheduling time delay is $T1=(4+k)*t$, t being equal to 1 ms, and k being larger than or equal to 0;

When the service type is an LTE service using an unlicensed spectrum, a second uplink scheduling time delay is $T2=(4+k)*t$, t being equal to 1 ms, k being larger than or equal to 0 and k being smaller than or equal to 7;

When the service type is an enhanced Mobile BroadBand (eMBB) service, a third uplink scheduling time delay is $T3=(4+k)*t$, t being smaller than or equal to 1 ms, and k being smaller than or equal to 0;

When the service type is an Ultra-Reliable and Low Latency Communications (URLLC) service, a fourth uplink scheduling time delay is $T4=(4+k)*t$, t being smaller than 1 ms, k being smaller than or equal to 0, and T4 being smaller than T3;

When the service type is a massive Machine Type Communications (mMTC), a fifth uplink scheduling time delay is $T5=(4+k)*t$, t being larger than or equal to 2 ms, and k being larger than or equal to 0.

Sending the UL grant signaling to the terminal, and indicating the uplink transmission information of the uplink data in the UL grant signaling, includes:

Determining a number of time for sending the uplink data;

When the number of time for sending the uplink data is more than one, determining whether a plurality of consecutive sending time is occupied for sending the uplink data;

When the plurality of consecutive sending time is occupied, carrying the time for sending the uplink data the first time and the number of time for sending the uplink data in the UL grant signaling, sending the UL grant signaling to the terminal;

When a plurality of non-consecutive sending time is occupied, carrying the time for sending the uplink data the first time, the number of time for sending the uplink data and the time interval between every two times for sending the uplink data in the UL grant signaling, sending the UL grant signaling to the terminal.

The uplink transmission method further includes:

When the number of time for sending the uplink data is one, carrying the time for sending the uplink data and the number of time for sending the uplink data in the UL grant signaling, and sending the UL grant signaling to the terminal.

Informing the terminal of the duration information of the single transmission time interval t, the information of the time delay correction value k and the uplink transmission information, includes:

Configuring a mapping table for storing the duration information of the single transmission time interval t, the information of the time delay correction value k and the uplink transmission information, and sending the mapping table to the terminal for storing; when the service type reported by the terminal is received, selecting information used by the uplink transmission from the mapping table according to the service type, and informing the terminal through the UL grant signaling; or Receiving the service type reported by the terminal, and determining the time length of the single transmission time interval t and the time delay correction value k according to the service type, sending the determined time length of the single transmission time interval t, the time delay correction value k and the uplink transmission information to the terminal through a radio resource control signaling; or After the base station determines the time length of the single transmission time interval t, the time delay correction value k and the uplink transmission information, indicating taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

A second aspect of the present disclosure provides a base station, which includes:

A determination unit, configured to determine a time length of a single transmission time interval t and a time delay correction value k corresponding to a service type, according to a transmitted service type, t being equal to $2^n*5^m$ ms, m and n being integers, and k being an integer that is larger than or equal to −4;

A sending unit, configured to send UL grant signaling to a terminal, and indicate uplink transmission information of uplink data in the UL grant signaling, the uplink transmission information including tune for sending the uplink data the first time and a number of time for sending the uplink data, or the uplink transmission information including the time for sending the uplink data for the first time, the number of time for sending the uplink data and a time interval between every two times for sending the uplink data;

An informing unit, configured to inform the terminal of duration information of the single transmission time interval t, information of the time delay correction value k and the uplink transmission information;

A receiving unit, configured to receive the uplink data transmitted by the terminal according to the duration information of the single transmission time interval t, the information of the time delay correction value k and the uplink transmission information, to implement an uplink transmission.

When the service type is a Long Term Evolution (LTE) service using a licensed frequency spectrum, a first uplink scheduling time delay is $T1=(4+k)*t$, t is equal to 1 ms, and k is larger than or equal to 0;

When the service type is an LTE service using an unlicensed spectrum, a second uplink scheduling time delay is $T2=(4+k)*t$, t is equal to 1 ms, k is larger than or equal to 0 and k is smaller than or equal to 7;

When the service type is an enhanced Mobile BroadBand (eMBB) service, a third uplink scheduling time delay is $T3=(4+k)*t$, t is smaller than or equal to 1 ms, and k is smaller than or equal to 0;

When the service type is an Ultra-Reliable and Low Latency Communications (URLLC) service, a fourth uplink scheduling time delay is $T4=(4+k)*t$, t is smaller than 1 ms, k is smaller than or equal to 0, and T4 is smaller than T3;

When the service type is a massive Machine Type Communications (mMTC), a fifth uplink scheduling time delay is $T5=(4+k)*t$, t is larger than or equal to 2 ms, and k is larger than or equal to 0.

The sending unit is specifically configured to:

Determine a number of time for sending the uplink data;

When the number of time for sending the uplink data is more than one, determine whether a plurality of consecutive sending time is occupied for sending the uplink data;

When the plurality of consecutive sending time is occupied, carry the time for sending the uplink data the first time and the number of time for sending the uplink data in the UL grant signaling, and send the UL grant signaling to the terminal;

When a plurality of non-consecutive sending time is occupied, carry the time for sending the uplink data the first time, the number of time for sending the uplink data and the time interval between every two times for sending the uplink data in the UL grant signaling, and send the UL grant signaling to the terminal.

The sending unit is further configured to:

When the number of time for sending the uplink data is one, carry the time for sending the uplink data and the number of time for sending the uplink data in the UL grant signaling, and send the UL grant signaling to the terminal.

The informing unit is specifically configured to:

Configure a mapping table for storing the duration information of the single transmission time interval t, the information of the time delay correction value k and the uplink transmission information, and send the mapping table to the terminal for storing; when the service type reported by the terminal is received, select information used by the uplink transmission from the mapping table according to the service type, and inform the terminal through the UL grant signaling; or Receive the service type reported by the terminal, and determine the time length of the single transmission time interval t and the time delay correction value k according to the service type, send the determined time length of the single transmission time interval t, the time delay correction value k and the uplink transmission information to the terminal through a radio resource control signaling; or After the base station determines the time length of the single transmission time interval t, the time delay correction value k and the uplink transmission information, indicate taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

The present disclosure has the following beneficial effects:

The base station can determine the time length of the single transmission time interval t and the time delay correction value k corresponding to the service type according to the transmitted service type, and carry the transmission information related to send the uplink data in the UL grant signaling, then inform the terminal of parameters and the information; the terminal can determine the time and the way for transmitting uplink data according to the parameters and the information, as the value of the single transmission time interval t and the time delay correction value k are determined according to the service type. Thus, the time delay requirements of different services can be fully satisfied, and especially for services with higher delay requirements in the future 5G service, the service requirements can be adapted by configuring an appropriate value of the t and the k, and the flexibility of system can be improved, meanwhile data transmission experience of the users also can be improved.

BRIEF DESCRIPTION OF THE DRAWINGS

In order to describe the technical solutions in embodiments of the present disclosure or in the prior art more clearly, the following briefly introduces the accompanying drawings needed for describing the embodiments. Obviously, the accompanying drawings in the following description show some embodiments of the present disclosure, and persons of ordinary skill in the art may still derive other drawings from these accompanying drawings without creative effort.

DETAILED DESCRIPTION

The following clearly and completely describes the technical solutions in the embodiments of the present disclosure with reference to the accompanying drawings in the embodiments of the present disclosure. Obviously, the described embodiments are a part rather than all of the embodiments of the present disclosure. All other embodiments acquired by persons of ordinary skill in the art based on the embodiments of the present disclosure without creative effort shall fall within the protective scope of the present disclosure.

In the embodiments of the present disclosure, the communication system may include a base station and a terminal.

User equipment in the embodiments of the present disclosure may also be referred to as a terminal, which can include a smart phone (such as an ANDROID™ mobile phone, an IOS™ mobile phone, a WINDOWS™ mobile phone and the like), a tablet computer, a palm computer, a notebook computer, a Mobile Internet Device (MID) or wearable equipment and the like, and the user equipment is only an example, but is not limited to the user equipment as described above.

The base station in the embodiment of the present disclosure can configure a time length of a single Transmission Time Interval (TTI) and a time delay correction value k corresponding to a service type according to a service transmitted between the base station and the terminal, and send related configuration information to the terminal through the uplink (UL) grant signaling. After the terminal receives the configuration information, the terminal can transmit uplink data according to the configuration information. The present disclosure is described in detail in combination with FIG. 1 to FIG. 3.

Figure 1:
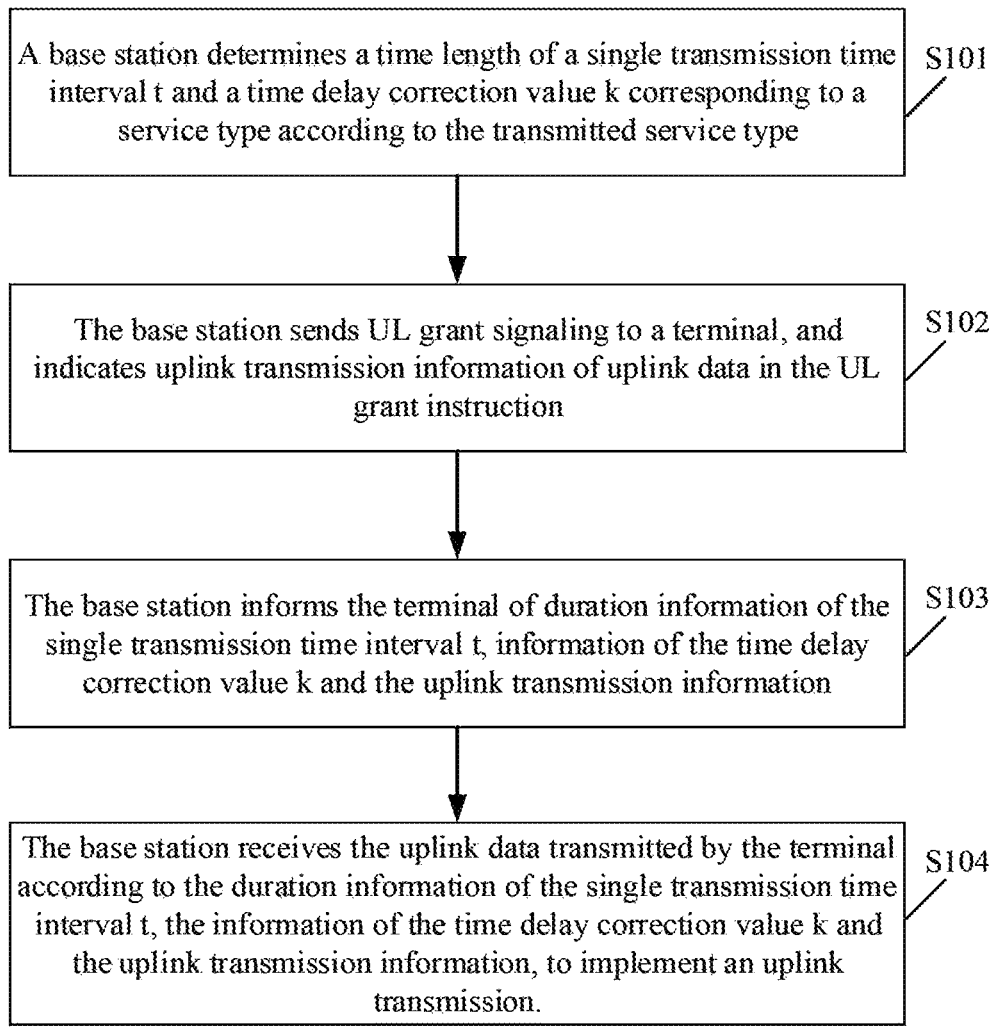
FIG. 1 is a flow chart of an uplink transmission method in a first embodiment of the present disclosure.

Referring to FIG. 1, which is a flow chart of an uplink transmission method in a first embodiment of the present disclosure, in the embodiment, the method includes the following steps:

Step S101, a base station determines a time length of a single transmission time interval t and a time delay correction value k corresponding to a service type according to the transmitted service type.

The transmitted service type may include, but is not limited to, a Long Term Evolution (LTE) service using a licensed frequency spectrum, an LTE service using an unlicensed spectrum, an enhanced Mobile BroadBand (eMBB) service, an Ultra-Reliable and Low Latency Communications (URLLC) service and a massive Machine Type Communications (mMTC). The time delay requirements of each service are different.

t is equal to $2^n*5^m$ ms, m and n are integers, and k is an integer that is larger than or equal to −4.

M and n may be positive integers or negative integers, and also may be 0. Optionally, the base station can determine to use different time lengths TTI for different services. For example, m may be determined to be 0, and n may be equal to −3, −2 and −1, and also n can be equal to 1, 2, 3, and n can also be equal to 0, thus, the time length of the TTI can be 0.125 ms, 0.25 ms, 0.5 ms, 2 ms, 4 ms, 8 ms or 1 ms. Or, n may be determined to be 0, and m may be equal to −3, −2 and −1, and also m can be equal to 1, 2, 3, and m can also be equal to 0, thus, the time length of the TTI can be 0.008 ms, 0.04 ms, 0.2 ms, 5 ms, 25 ms, 125 ms or 1 ms. Certainly, neither m nor n can be 0, for example, m is −1, and n is 2, the time length of the TTI is 0.8 ms. According to different service requirements, the base station can adaptively adjust values of m and n to adapt to the service requirements, the embodiments of the present disclosure are not limited in any way.

The time delay correction value can be used to correct the number of TTI, which can be a positive integer, 0 or a negative integer larger than or equal to −4. For example, referring to the LTE frequency division duplex system, after the base station sends uplink grant signaling, the terminal needs to send the uplink data after undergoing four TTIs, and then the uplink scheduling time delay can be regarded as being four TTIs. In this embodiment, according to the service type, the number of the TTI can be adjusted by a time delay correction value k. When k is a positive number, the uplink scheduling delay is larger than 4 TTIs; when k is 0, the uplink scheduling time delay is still 4 TTIs; when k is a negative number, the uplink scheduling time delay is less than 4 TTIs.

After t and k are determined, the uplink scheduling time delay T can be calculated according to the following formula:

$$T=(4+k)*t$$

For example, UL grant signaling is sent at time n, the first time that sent uplink data is n+(4+k)*t Due to different service types having different requirements for the time delay, the values of k and t are different.

Optionally, When the service type is an LTE service using a licensed frequency spectrum, a first uplink scheduling time delay is T1=(4+k)*t, t is equal to 1 ms, and k is larger than or equal to 0. When it is a Frequency Division Duplex (FDD) system, k is equal to 0; when it is Time Division Duplexing (TDD), k can be larger than 0.

When the service type is an LTE service using an unlicensed spectrum, a second uplink scheduling time delay is T2=(4+k)*t, t is equal to 1 ms, k is larger than or equal to 0, and k is smaller than or equal to 7;

When the service type is an eMBB service, a third uplink scheduling time delay is T3=(4+k)*t, t is smaller than or equal to 1 ms, and k is smaller than or equal to 0;

When the service type is a URLLC service, a fourth uplink scheduling time delay is T4=(4+k)*t, t is smaller than 1 ms, k is smaller than or equal to 0, and T4 is smaller than T3;

When the service type is an mMTC, a fifth uplink scheduling time delay is T5=(4+k)*t, t is larger than or equal to 2 ms, and k is larger than or equal to 0.

The uplink scheduling time delay t can be calculated to obtain a specific result, or cannot be calculated to obtain a specific result. When the specific result is to be calculated, the specific result can be calculated by the base station and also be calculated by the terminal after receiving values of k and t, it is not limited in the embodiment of the present disclosure.

Step S102, the base station sends UL grant signaling to a terminal, and indicates uplink transmission information of uplink data in the UL grant signaling.

Optionally, the uplink transmission information includes time for sending the uplink data the first time and a number of time for sending the uplink data, or the uplink transmission information includes the time for sending the uplink data for the first time, the number of time for sending the uplink data and a time interval between every two times for sending the uplink data.

Optionally, UL grant signaling can schedule one or more uplink transmission time, thus, time for sending the uplink data the first time and a number N of time for sending the uplink data need to be indicated in the UL grant signaling. When more than one uplink transmission time exists, the time can be continuous or discontinuous, therefore it is also necessary to determine according to the situation whether it is necessary to indicate a time interval between every two time for sending the uplink data. The time interval between every two times for sending the uplink data may be the same, or different. The time interval between every two times for sending the uplink data may be the same, it is similar to periodic transmission of uplink data.

For example, in an LTE licensed frequency spectrum, N is equal to 1; in another example, in an LTE unlicensed spectrum, N is equal to 1, and N can also be equal to 2 to 4. There are a plurality of continuous sending time intervals when N is equal to 2 to 4; in another example, in the mMTC service, N can also be larger than or equal to 3, the time interval between every two times may be the same, it is similar to periodic transmission of the uplink data (such as reporting values of water meters).

Step S103, the base station informs the terminal of duration information of the single transmission time interval t, information of the time delay correction value k and the uplink transmission information.

Optionally, an informing manner may include, but is not limited to, using existing signaling to carry related information and sending the related information to the terminal, constructing a related information mapping table and informing the terminal through a mapping manner.

Step S104, the base station receives the uplink data transmitted by the terminal according to the duration information of the single transmission time interval t, the information of the time delay correction value k and the uplink transmission information, to implement an uplink transmission.

After receiving the information, the terminal knows when to send uplink data, to implement an uplink transmission with the base station successfully.

In this embodiment, the base station can determine the time length of the single transmission time interval t and the time delay correction value k corresponding to the service type according to the transmitted service type, and carry the transmission information related to send the uplink data in the UL grant signaling, then inform the terminal of parameters and the information; the terminal can determine the time and the way for transmitting uplink data according to the parameters and the information, as the value of the single transmission time interval t and the time delay correction value k are determined according to the service type. Thus, the time delay requirements of different services can be fully satisfied, and especially for services with higher delay requirements in the future 5G service, the service requirements can be adapted by configuring an appropriate value of the t and the k, and the flexibility of system can be improved, meanwhile data transmission experience of the users also can be improved.

Figure 2:
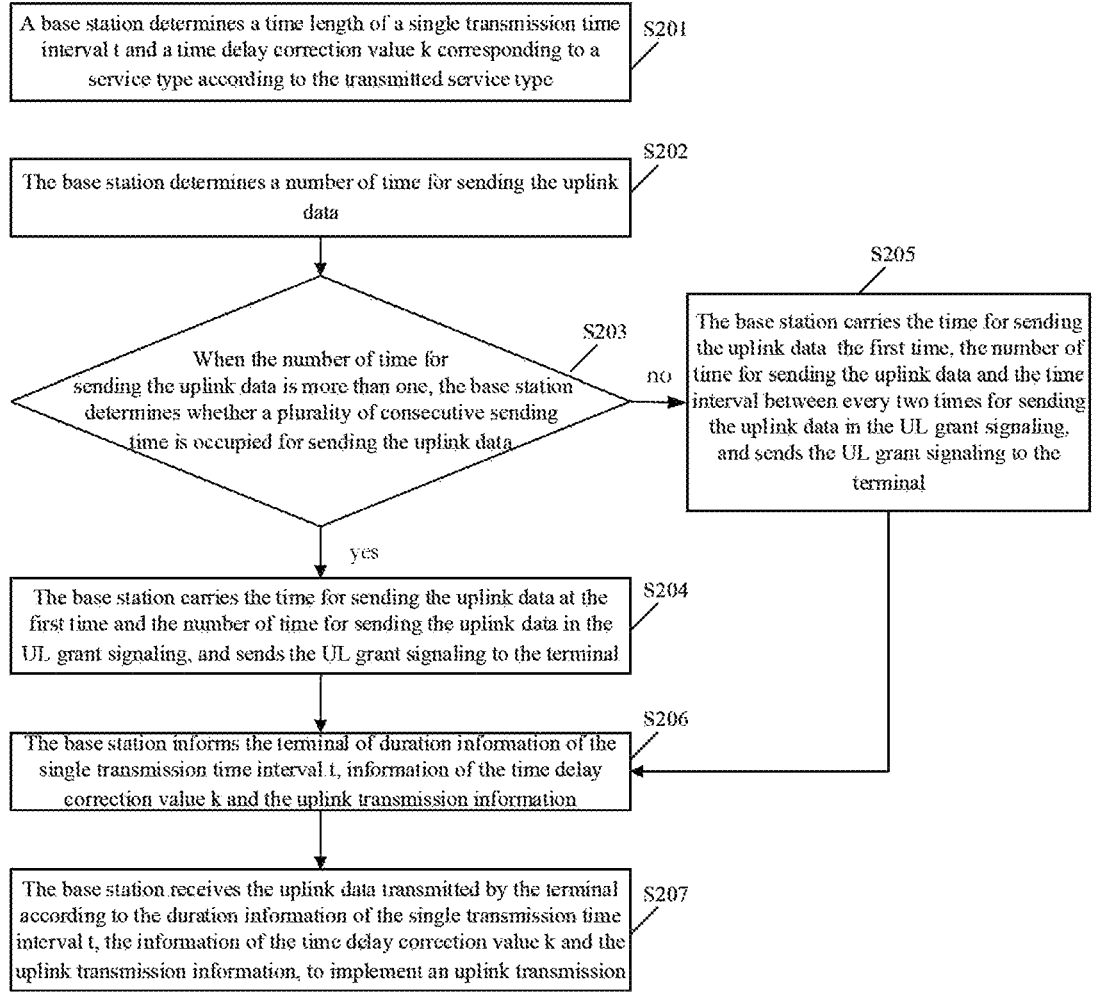
FIG. 2 is a flow chart of an uplink transmission method in a second embodiment of the present disclosure.

Referring to FIG. 2, which is a flow chart of an uplink transmission method in a second embodiment of the present disclosure, in the embodiment, the method includes the following steps:

Step S201, a base station determines a time length of a single transmission time interval t and a time delay correction value k corresponding to a service type according to the transmitted service type.

t is equal to $2^n*5^m$ ms, m and n are integers, and k is an integer that is larger than or equal to −4.

Step S202, the base station determines a number of time for sending the uplink data.

Step S203, when the number of time for sending the uplink data is more than one, the base station determines whether a plurality of consecutive sending time is occupied for sending the uplink data. When the base station determines a plurality of consecutive sending time is occupied for sending the uplink data, step S204 is executed, when the base station determines a plurality of consecutive sending time is not occupied for sending the uplink data, step S205 is executed.

Optionally, when the number of time for sending the uplink data is one, carrying the time for sending the uplink data and the number of time for sending the uplink data in the UL grant signaling, and sending the UL grant signaling to the terminal.

Step S204, the base station carries the time for sending the uplink data the first time and the number of time for sending the uplink data in the UL grant signaling, and sends the UL grant signaling to the terminal.

After step S204, step S206 to step S207 are executed.

Step S205, the base station carries the time for sending the uplink data the first time, the number of time for sending the uplink data and the time interval between every two times for sending the uplink data in the UL grant signaling, and sends the UL grant signaling to the terminal.

After step S205, step S206 to step S207 are executed.

Step S206, the base station informs the terminal of duration information of the single transmission time interval t, information of the time delay correction value k and the uplink transmission information.

Step S207, the base station receives the uplink data transmitted by the terminal according to the duration information of the single transmission time interval t, the information of the time delay correction value k and the uplink transmission information, to implement an uplink transmission.

The embodiments of the present disclosure mainly describes contents included in the uplink transmission information, which is determined according to the continuity of uplink data transmission, it is ensured that the terminal can clearly determine the time and the way of uplink transmission.

Figure 3:
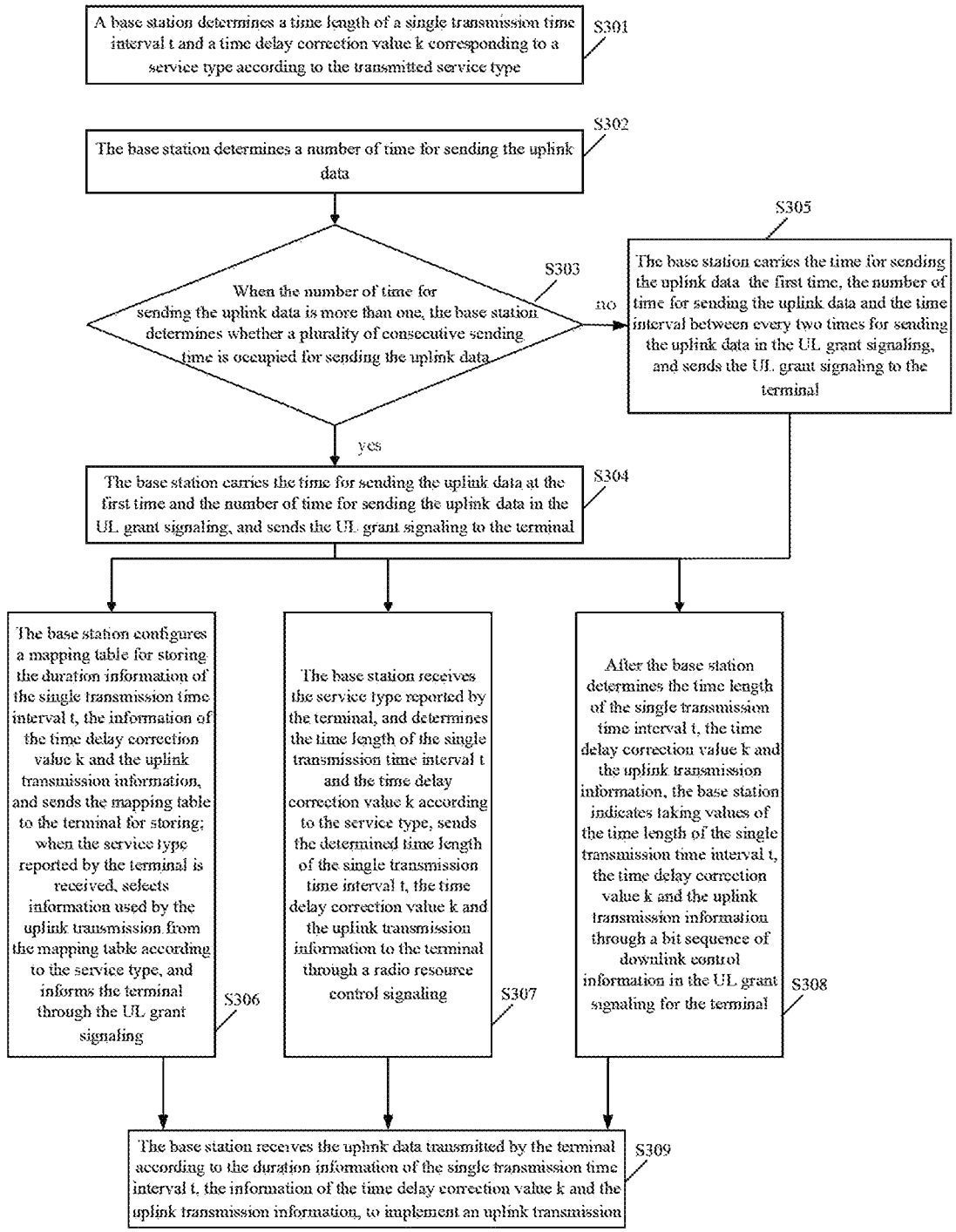
FIG. 3 is a flow chart of an uplink transmission method in a third embodiment of the present disclosure.

Referring to FIG. 3, which is a flow chart of an uplink transmission method in a third embodiment of the present disclosure, in the embodiment, the method includes the following steps:

Step S301, a base station determines a time length of a single transmission time interval t and a time delay correction value k corresponding to a service type according to the transmitted service type.

t is equal to $2^n*5^m$ ms, m and n are integers, and k is an integer that is larger than or equal to −4.

Step S302, the base station determines a number of time for sending the uplink data.

Step S303, when the number of time for sending the uplink data is more than one, the base station determines whether a plurality of consecutive sending time is occupied for sending the uplink data. When the base station determines a plurality of consecutive sending time is occupied for sending the uplink data, step S304 is executed, when the base station determines a plurality of consecutive sending time is not occupied for sending the uplink data, step S305 is executed.

Optionally, when the number of time for sending the uplink data is one, carrying the time for sending the uplink data and the number of time for sending the uplink data in the UL grant signaling, and sending the UL grant signaling to the terminal.

Step S304, the base station carries the time for sending the uplink data the first time and the number of time for sending the uplink data in the UL grant signaling, and sends the UL grant signaling to the terminal.

After step S304, at least one of step S306 to step S308 is selected to inform the terminal of related parameters, and step S309 is repeatedly executed.

Step S305, the base station carries the time for sending the uplink data the first time, the number of time for sending the uplink data and the time interval between every two times for sending the uplink data in the UL grant signaling, sending the UL grant signaling to the terminal.

After step S305, at least one of step S306 to step S308 is selected to inform the terminal of related parameters, and step S309 is repeatedly executed.

Step S306, the base station configures a mapping table for storing the duration information of the single transmission time interval t, the information of the time delay correction value k and the uplink transmission information, and sends the mapping table to the terminal for storing; when the service type reported by the terminal is received, selects information used by the uplink transmission from the mapping table according to the service type, and informs the terminal through the UL grant signaling.

Step S307, the base station receives the service type reported by the terminal, and determines the time length of the single transmission time interval t and the time delay correction value k according to the service type, sends the determined time length of the single transmission time interval t, the time delay correction value k and the uplink transmission information to the terminal through a radio resource control signaling.

Step S308, after the base station determines the time length of the single transmission time interval t, the time delay correction value k and the uplink transmission information, the base station indicates taking values of the time length of the single transmission time interval t, the time delay correction value k and the uplink transmission information through a bit sequence of downlink control information in the UL grant signaling for the terminal.

The terminal pre-stores a mapping relation table of the bit sequence of the downlink control information, the time length of the single transmission time interval t, the time delay correction value k and the uplink transmission information.

It should be noted that, any one of step S306 to step S308 may be used to inform the time length of the single transmission time interval t, the time delay correction value k and the uplink transmission information may use to the terminal, and a same informing manner or a different informing way may be used to inform the time length of the single transmission time interval t, the time delay correction value k and the uplink transmission information, the embodiments of the present disclosure do not limit this.

Step S309, the base station receives the uplink data transmitted by the terminal according to the duration information of the single transmission time interval t, the information of the time delay correction value k and the uplink transmission information, to implement an uplink transmission.

The embodiments of the present disclosure mainly describes manners for informing the terminal relevant parameters by the base station. Corresponding to different informing manners, the parameters can be static or semi-static, and can also be dynamic. When the parameters is dynamic, the value of the parameters can be changed for each uplink grant signaling, so as to adapt to different service types of the terminal users and service loads in a current cell. For example, when other users in the current cell have many services, the uplink scheduling time delay of the current terminal users can be large correspondingly, when the service of other users in the cell is very small, the uplink scheduling time delay of the current terminal users can be small correspondingly, thus the system resources are more fully utilized.

Figure 4:
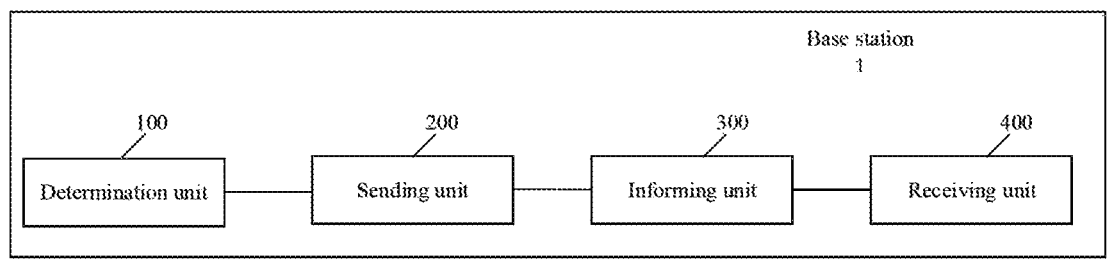
FIG. 4 is a schematic diagram of a base station provided in an embodiment of the present disclosure.

Referring to FIG. 4, which is a schematic diagram of a base station provided in an embodiment of the present disclosure, in the embodiment, the base station includes:

A determination unit 100, configured to determine a time length of a single transmission time interval t and a time delay correction value k corresponding to a service type, according to a transmitted service type, t being equal to $2^n*5^m$ ms, m and n being integers, and k being an integer that is larger than or equal to −4;

A sending unit 200, configured to send UL grant signaling to a terminal, and indicate uplink transmission information of uplink data in the UL grant signaling, the uplink transmission information including time for sending the uplink data the first time and a number of time for sending the uplink data, or the uplink transmission information including the time for sending the uplink data for the first time, the number of time for sending the uplink data and a time interval between every two times for sending the uplink data;

An informing unit 300, configured to inform the terminal of duration information of the single transmission time interval t, information of the time delay correction value k and the uplink transmission information;

A receiving unit 400, configured to receive the uplink data transmitted by the terminal according to the duration information of the single transmission time interval t, the information of the time delay correction value k and the uplink transmission information, to implement an uplink transmission.

Optionally, when the service type is an LTE service using a licensed frequency spectrum, a first uplink scheduling time delay is $T1=(4+k)*t$, t is equal to 1 ms, and k is larger than or equal to 0;

When the service type is an LTE service using an unlicensed spectrum, a second uplink scheduling time delay is $T2=(4+k)*t$, t is equal to 1 ms, k is larger than or equal to 0 and k is smaller than or equal to 7;

When the service type is an eMBB service, a third uplink scheduling time delay is $T3=(4+k)*t$, t is smaller than or equal to 1 ms, and k is smaller than or equal to 0;

When the service type is a URLLC service, a fourth uplink scheduling time delay is $T4=(4+k)*t$, t is smaller than 1 ms, k is smaller than or equal to 0, and T4 is smaller than T3;

When the service type is an mMTC, a fifth uplink scheduling time delay is $T5=(4+k)*t$, t is larger than or equal to 2 ms, and k is larger than or equal to 0.

The sending unit 200 is specifically configured to:

Determine a number of time for sending the uplink data;

When the number of time for sending the uplink data is more than one, determine whether a plurality of consecutive sending time is occupied for sending the uplink data;

When the plurality of consecutive sending time is occupied, carry the time for sending the uplink data the first time and the number of time for sending the uplink data in the UL grant signaling, and send the UL grant signaling to the terminal;

When a plurality of non-consecutive sending time is occupied, carry the time for sending the uplink data the first time, the number of time for sending the uplink data and the time interval between every two times for sending the uplink data in the UL grant signaling, and send the UL grant signaling to the terminal.

Optionally, the sending unit 200 is further configured to:

When the number of time for sending the uplink data is one, carry the time for sending the uplink data and the number of time for sending the uplink data in the UL grant signaling, and send the UL grant signaling to the terminal.

Optionally, the informing unit 300 is specifically configured to:

Configure a mapping table for storing the duration information of the single transmission time interval t, the information of the time delay correction value k and the uplink transmission information, and send the mapping table to the terminal for storing; when the service type reported by the terminal is received, select information used by the uplink transmission from the mapping table according to the service type, and inform the terminal through the UL grant signaling; or Receive the service type reported by the terminal, and determine the time length of the single transmission time interval t and the time delay correction value k according to the service type, send the determined time length of the single transmission time interval t, the time delay correction value k and the uplink transmission information to the terminal through a radio resource control signaling; or After the base station determines the time length of the single transmission time interval t, the time delay correction value k and the uplink transmission information, indicate taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

Figure 5:
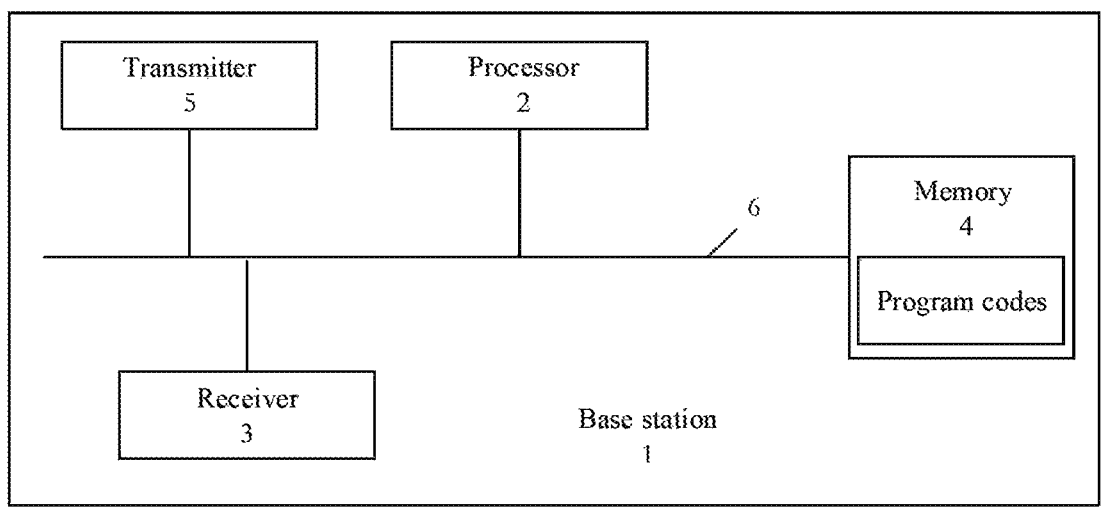
FIG. 5 is a schematic structural diagram of a base station provided in an embodiment of the present disclosure.

Referring to FIG. 5, which is a schematic structural diagram of a base station provided in an embodiment of the present disclosure.

As shown in FIG. 5, the base station 1 in the embodiment of the present disclosure includes: at least one processor 2, such as a Central Processing Unit (CPU), at least one receiver 3, at least one memory 4, at least one transmitter 5 and at least one communication bus 6. The communication bus 6 is used to realize a communication connection between these components. The receiver 3 and the transmitter 5 may be a wired transmission port, and can also be a wireless device, for example, an antenna device is used to perform a data communication with other devices. The memory 4 can be a high-speed Random Access Memory (RAM) memory or a non-volatile memory, such as at least one disk storage.

The processor 2 can execute an operating system of the base station 1 and various installed applications, program codes and the like, for example, each unit as described above, which includes the determination unit 100, the sending unit 200, the informing unit 300, the receiving unit 400 and the like.

The memory 4 stores program codes, and the processor 2 can transfer the program codes stored in the memory 4 to execute relevant functions through the communication bus 6. For example, each of the units as described in FIG. 5 and FIG. 6 (e.g., the determination unit 100, the sending unit 200, the informing unit 300, the receiving unit 400 and the like.) is program codes stored in the memory 4 and is executed by the processor 2, thus function of each unit can be realized so as to realize the uplink transmission method.

In one embodiment of the present disclosure, the memory 4 stores a plurality of instructions, and the instructions are executed by the processor 2 to achieve an uplink transmission method. Specifically, the processor 2 determines a time length of a single transmission time interval t and a time delay correction value k corresponding to a service type, t being equal to $2^n*5^m$ ms, m and n being integers, and k being an integer that is larger than or equal to −4 sending uplink (UL) grant signaling to a terminal, and indicating uplink transmission information of uplink data in the UL grant signaling, the uplink transmission information including time for sending the uplink data the first time and a number of time for sending the uplink data, or the uplink transmission information including the time for sending the uplink data for the first time, the number of time for sending the uplink data and a time interval between every two times for sending the uplink data; informing the terminal of duration information of the single transmission time interval t, information of the time delay correction value k and the uplink transmission information; and receiving the uplink data transmitted by the terminal according to the duration information of the single transmission time interval t, the information of the time delay correction value k and the uplink transmission information, to implement an uplink transmission.

In a further embodiment, when the service type is a LTE service using a licensed frequency spectrum, a first uplink scheduling time delay is $T1=(4+k)*t$, t is equal to 1 ms, and k is larger than or equal to 0;

When the service type is an LTE service using an unlicensed spectrum, a second uplink scheduling time delay is $T2=(4+k)*t$, t is equal to 1 ms, k is larger than or equal to 0 and k is smaller than or equal to 7;

When the service type is an eMBB service, a third uplink scheduling time delay is $T3=(4+k)*t$, t is smaller than or equal to 1 ms, and k is smaller than or equal to 0;

When the service type is a URLLC service, a fourth uplink scheduling time delay is $T4=(4+k)*t$, t is smaller than 1 ms, k is smaller than or equal to 0, and T4 is smaller than T3;

When the service type is an mMTC, a fifth uplink scheduling time delay is $T5=(4+k)*t$, t is larger than or equal to 2 ms, and k is larger than or equal to 0.

In a further embodiment, sending the UL grant signaling to the terminal, and indicating the uplink transmission information of the uplink data in the UL grant signaling, includes:

Determining a number of time for sending the uplink data;

When the number of time for sending the uplink data is more than one, determining whether a plurality of consecutive sending time is occupied for sending the uplink data;

When the plurality of consecutive sending time is occupied, carrying the time for sending the uplink data the first time and the number of time for sending the uplink data in the UL grant signaling, and sending the UL grant signaling to the terminal;

When a plurality of non-consecutive sending time is occupied, carrying the time for sending the uplink data the first time, the number of time for sending the uplink data and the time interval between every two times for sending the uplink data in the UL grant signaling, sending the UL grant signaling to the terminal.

In a further embodiment, when the number of time for sending the uplink data is one, the processor 2 carries the time for sending the uplink data and the number of time for sending the uplink data in the UL grant signaling, and sends the UL grant signaling to the terminal.

In a further embodiment, informing the terminal of the duration information of the single transmission time interval t, the information of the time delay correction value k and the uplink transmission information, includes:

Configuring a mapping table for storing the duration information of the single transmission time interval t, the information of the time delay correction value k and the uplink transmission information, and sending the mapping table to the terminal for storing; when the service type reported by the terminal is received, selecting information used by the uplink transmission from the mapping table according to the service type, and informing the terminal through the UL grant signaling; or Receiving the service type reported by the terminal, and determining the time length of the single transmission time interval t and the time delay correction value k according to the service type, sending the determined time length of the single transmission time interval t, the time delay correction value k and the uplink transmission information to the terminal through a radio resource control signaling; or After the base station determines the time length of the single transmission time interval t, the time delay correction value k and the uplink transmission information, indicating taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

Specifically, the processor 2 is used for implementing a specific implementation method of the instruction the description of related steps in the embodiments corresponding to FIG. 1 to FIG. 3 can be referred to, and the description is not repeated herein. Through the description of the embodiments, the present invention has the following advantages:

The base station can determine the time length of the single transmission time interval t and the time delay correction value k corresponding to the service type according to the transmitted service type, and carry the transmission information related to send the uplink data in the UL grant signaling, then inform the terminal of parameters and the information; the terminal can determine the time and the way for transmitting uplink data according to the parameters and the information, as the value of the single transmission time interval t and the time delay correction value k are determined according to the service type. Thus, the time delay requirements of different services can be fully satisfied, and especially for services with higher delay requirements in the future 5G service, the service requirements can be adapted by configuring an appropriate value of the t and the k, and the flexibility of system can be improved, meanwhile data transmission experience of the users also can be improved.

Various embodiments in the specification are described in a progressive manner, each embodiment focuses on differences from other embodiments, and the parts with the same similarity among the embodiments can be seen from each other. For device embodiments, it is substantially similar to the method embodiments, thus the description is simple and relevant part can refer to the partial description of the method embodiment.

In the embodiments provided in the present application, it should be understood that the disclosed devices can be implemented in other manners. For example, the device embodiments described above are merely illustrative, such as the division of the units only is one logical function division, and in actual implementation, additional division manners can be achieved, for example, a plurality of units or components may be combined or may be integrated into another system, or some features may be ignored or not executed. Another point, the displayed or discussed mutual coupling or direct coupling or communication connection can be through an indirect coupling or communication connection of some interfaces, the device or the unit, and can be in an electrical or other form.

The units illustrated as separate components may be or may not be physically separated, the components displayed as a unit may be or may not be a physical unit, that can be located in one place, or distributed to a plurality of network units. The objective of scheme of the embodiment can be realized by selecting some or all of the units according to actual needs.

In addition, the functional units in various embodiments of the present disclosure can be integrated in a processing unit, also can be that each unit physically exists separately, and also two or more units can be integrated in one unit. The integrated unit can be implemented in the form of hardware, and can also be implemented in the form of a software functional unit.

The integrated unit is implemented in the form of a software functional unit and sold or used as an independent product, the integrated unit can be stored in a computer readable storage medium. Based on such understanding, the technical solution of the present disclosure essentially or partially makes contributions to the prior art or all or part of the technical scheme can be embodied in the form of a software product, the computer software product is stored in a storage medium, and the computer software product includes a plurality of instructions for enabling one computer device (which can be a personal computer, server or network equipment and the like) to execute all or part of the steps of the method according to the embodiments of the present disclosure. The storage medium includes a magnetic disk, an optical disk and a Read-Only Memory (ROM) or Random Access Memory (RAM) and the like.

The above embodiments are only used to illustrate the technical solutions of the present disclosure and are not limited thereto; although the present disclosure has been described in detail with reference to the foregoing embodiments, it should be understood by those of ordinary skill in the art that the technical solutions described in the embodiments can still be modified, or the technical features in the technical solutions can be equivalently replaced; and that the modification or replacement does not make the essence of the corresponding technical solution depart from the scope of the technical solutions of the embodiments of the present disclosure.

What is claimed is:

1. An uplink transmission method, comprising:
determining, by a base station, a time length of a single transmission time interval t and a time delay correction value k corresponding to a service type, according to a transmitted service type, the single transmission time interval t being equal to $2^n*5^m$ ms, m and n being integers, and k being an integer that is larger than or equal to −4;
sending uplink (UL) grant signaling to a terminal, and indicating uplink transmission information of uplink data in the UL grant signaling, the uplink transmission information comprising time for sending the uplink data the first time and a number of time for sending the uplink data, or the uplink transmission information comprising the time for sending the uplink data for the first time, the number of time for sending the uplink data and a time interval between every two times for sending the uplink data;
informing the terminal of duration information of the single transmission time interval t, information of the time delay correction value k and the uplink transmission information; and receiving the uplink data transmitted by the terminal according to the duration information of the single transmission time interval t, the information of the time delay correction value k and the uplink transmission information, to implement an uplink transmission.

2. The uplink transmission method of claim 1, wherein:
when the service type is a Long Term Evolution (LTE) service using a licensed frequency spectrum, a first uplink scheduling time delay is $T1=(4+k)*t$, t being equal to 1 ms, and k being larger than or equal to 0;
when the service type is an LTE service using an unlicensed spectrum, a second uplink scheduling time delay is $T2=(4+k)*t$, t being equal to 1 ms, k being larger than or equal to 0 and k being smaller than or equal to 7;
when the service type is an enhanced Mobile BroadBand (eMBB) service, a third uplink scheduling time delay is $T3=(4+k)*t$, t being smaller than or equal to 1 ms, and k being smaller than or equal to 0;
when the service type is an Ultra-Reliable and Low Latency Communications (URLLC) service, a fourth uplink scheduling time delay is $T4=(4+k)*t$, t being smaller than 1 ms, k being smaller than or equal to 0, and T4 being smaller than T3;
when the service type is a massive Machine Type Communications (mMTC), a fifth uplink scheduling time delay is $T5=(4+k)*t$, t being larger than or equal to 2 ms, and k being larger than or equal to 0.

3. The uplink transmission method of claim 2, wherein informing the terminal of the duration information of the single transmission time interval t, the information of the time delay correction value k and the uplink transmission information, comprises:
configuring a mapping table for storing the duration information of the single transmission time interval t, the information of the time delay correction value k and the uplink transmission information, and sending the mapping table to the terminal for storing; when the service type reported by the terminal is received, selecting information used by the uplink transmission from the mapping table according to the service type, and informing the terminal through the UL grant signaling; or
receiving the service type reported by the terminal, and determining the time length of the single transmission time interval t and the time delay correction value k according to the service type, sending the determined time length of the single transmission time interval t, the time delay correction value k and the uplink transmission information to the terminal through a radio resource control signaling; or
after the base station determines the time length of the single transmission time interval t, the time delay correction value k and the uplink transmission information, indicating taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

4. The uplink transmission method of claim 1, wherein sending the UL grant signaling to the terminal, and indicating the uplink transmission information of the uplink data in the UL grant signaling, comprises:
  determining a number of time for sending the uplink data;
  when the number of time for sending the uplink data is more than one, determining whether a plurality of consecutive sending time is occupied for sending the uplink data;
  when the plurality of consecutive sending time is occupied, carrying the time for sending the uplink data the first time and the number of time for sending the uplink data in the UL grant signaling, sending the UL grant signaling to the terminal;
  when a plurality of non-consecutive sending time is occupied, carrying the time for sending the uplink data the first time, the number of time for sending the uplink data and the time interval between every two times for sending the uplink data in the UL grant signaling, sending the UL grant signaling to the terminal.

5. The uplink transmission method of claim 4, further comprising:
  when the number of time for sending the uplink data is one, carrying the time for sending the uplink data and the number of time for sending the uplink data in the UL grant signaling, and sending the UL grant signaling to the terminal.

6. The uplink transmission method of claim 5, wherein informing the terminal of the duration information of the single transmission time interval t, the information of the time delay correction value k and the uplink transmission information, comprises:
  configuring a mapping table for storing the duration information of the single transmission time interval t, the information of the time delay correction value k and the uplink transmission information, and sending the mapping table to the terminal for storing; when the service type reported by the terminal is received, selecting information used by the uplink transmission from the mapping table according to the service type, and informing the terminal through the UL grant signaling; or
  receiving the service type reported by the terminal, and determining the time length of the single transmission time interval t and the time delay correction value k according to the service type, sending the determined time length of the single transmission time interval t, the time delay correction value k and the uplink transmission information to the terminal through a radio resource control signaling; or
  after the base station determines the time length of the single transmission time interval t, the time delay correction value k and the uplink transmission information, indicating taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

7. The uplink transmission method of claim 4, wherein informing the terminal of the duration information of the single transmission time interval t, the information of the time delay correction value k and the uplink transmission information, comprises:
  configuring a mapping table for storing the duration information of the single transmission time interval t, the information of the time delay correction value k and the uplink transmission information, and sending the mapping table to the terminal for storing; when the service type reported by the terminal is received, selecting information used by the uplink transmission from the mapping table according to the service type, and informing the terminal through the UL grant signaling; or
  receiving the service type reported by the terminal, and determining the time length of the single transmission time interval t and the time delay correction value k according to the service type, sending the determined time length of the single transmission time interval t, the time delay correction value k and the uplink transmission information to the terminal through a radio resource control signaling; or
  after the base station determines the time length of the single transmission time interval t, the time delay correction value k and the uplink transmission information, indicating taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

8. The uplink transmission method of claim 1, wherein informing the terminal of the duration information of the single transmission time interval t, the information of the time delay correction value k and the uplink transmission information, comprises:
  configuring a mapping table for storing the duration information of the single transmission time interval t, the information of the time delay correction value k and the uplink transmission information, and sending the mapping table to the terminal for storing; when the service type reported by the terminal is received, selecting information used by the uplink transmission from the mapping table according to the service type, and informing the terminal through the UL grant signaling; or
  receiving the service type reported by the terminal, and determining the time length of the single transmission time interval t and the time delay correction value k according to the service type, sending the determined time length of the single transmission time interval t, the time delay correction value k and the uplink transmission information to the terminal through a radio resource control signaling; or
  after the base station determines the time length of the single transmission time interval t, the time delay correction value k and the uplink transmission information, indicating taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

9. A base station, comprising:
a processor; and
a memory storing a plurality of instructions, which when executed by the processor, causes the processor to:
determine a time length of a single transmission time interval t and a time delay correction value k corresponding to a service type by the base station, according to a transmitted service type, the single transmission time interval t being equal to $2^n*5^m$ ms, m and n being integers, and k being an integer that is larger than or equal to −4;
send uplink (UL) grant signaling to a terminal, and indicate uplink transmission information of uplink data in the UL grant signaling, the uplink transmission information comprising time for sending the uplink data the first time and a number of time for sending the uplink data, or the uplink transmission information comprising the time for sending the uplink data for the first time, the number of time for sending the uplink data and a time interval between every two times for sending the uplink data;
inform the terminal of duration information of the single transmission time interval t, information of the time delay correction value k and the uplink transmission information; and
receive the uplink data transmitted by the terminal according to the duration information of the single transmission time interval t, the information of the time delay correction value k and the uplink transmission information, to implement an uplink transmission.

10. The base station of claim 9, wherein:
when the service type is a Long Term Evolution (LTE) service using a licensed frequency spectrum, a first uplink scheduling time delay is T1=(4+k)*t, t being equal to 1 ms, and k being larger than or equal to 0;
when the service type is an LTE service using an unlicensed spectrum, a second uplink scheduling time delay is T2=(4+k)*t, t being equal to 1 ms, k being larger than or equal to 0 and k being smaller than or equal to 7;
when the service type is an enhanced Mobile BroadBand (eMBB) service, a third uplink scheduling time delay is T3=(4+k)*t, t being smaller than or equal to 1 ms, and k being smaller than or equal to 0;
when the service type is an Ultra-Reliable and Low Latency Communications (URLLC) service, a fourth uplink scheduling time delay is T4=(4+k)*t, t being smaller than 1 ms, k being smaller than or equal to 0, and T4 being smaller than T3;
when the service type is a massive Machine Type Communications (mMTC), a fifth uplink scheduling time delay is T5=(4+k)*t, t being larger than or equal to 2 ms, and k being larger than or equal to 0.

11. The base station of claim 10, wherein the processor further:
configures a mapping table for storing the duration information of the single transmission time interval t, the information of the time delay correction value k and the uplink transmission information, and sends the mapping table to the terminal for storing; when the service type reported by the terminal is received, selects information used by the uplink transmission from the mapping table according to the service type, and informs the terminal through the UL grant signaling; or
receives the service type reported by the terminal, and determines the time length of the single transmission time interval t and the time delay correction value k according to the service type, sends the determined time length of the single transmission time interval t, the time delay correction value k and the uplink transmission information to the terminal through a radio resource control signaling; or
after the base station determines the time length of the single transmission time interval t, the time delay correction value k and the uplink transmission information, indicates taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

12. The base station of claim 9, wherein the processor further:
determines a number of time for sending the uplink data;
when the number of time for sending the uplink data is more than one, determines whether a plurality of consecutive sending time is occupied for sending the uplink data;
when the plurality of consecutive sending time is occupied, carries the time for sending the uplink data the first time and the number of time for sending the uplink data in the UL grant signaling, and sends the UL grant signaling to the terminal;
when a plurality of non-consecutive sending time is occupied, carries the time for sending the uplink data the first time, the number of time for sending the uplink data and the time interval between every two times for sending the uplink data in the UL grant signaling, and sends the UL grant signaling to the terminal.

13. The base station of claim 12, wherein the processor further:
when the number of time for sending the uplink data is one, carries the time for sending the uplink data and the number of time for sending the uplink data in the UL grant signaling, and sends the UL grant signaling to the terminal.

14. The base station of claim 13, wherein the processor further:
configures a mapping table for storing the duration information of the single transmission time interval t, the information of the time delay correction value k and the uplink transmission information, and sends the mapping table to the terminal for storing; when the service type reported by the terminal is received, selects information used by the uplink transmission from the mapping table according to the service type, and informs the terminal through the UL grant signaling; or
receives the service type reported by the terminal, and determines the time length of the single transmission time interval t and the time delay correction value k according to the service type, sends the determined time length of the single transmission time interval t, the time delay correction value k and the uplink transmission information to the terminal through a radio resource control signaling; or
after the base station determines the time length of the single transmission time interval t, the time delay correction value k and the uplink transmission information, indicates taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

15. The base station of claim 12, wherein the processor further:
configures a mapping table for storing the duration information of the single transmission time interval t, the information of the time delay correction value k and the uplink transmission information, and sends the mapping table to the terminal for storing; when the service type reported by the terminal is received, selects information used by the uplink transmission from the mapping table according to the service type, and informs the terminal through the UL grant signaling; or
receives the service type reported by the terminal, and determines the time length of the single transmission time interval t and the time delay correction value k according to the service type, sends the determined time length of the single transmission time interval t, the time delay correction value k and the uplink transmission information to the terminal through a radio resource control signaling; or
after the base station determines the time length of the single transmission time interval t, the time delay correction value k and the uplink transmission information, indicates taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

16. The base station of claim 9, wherein the processor further:
configures a mapping table for storing the duration information of the single transmission time interval t, the information of the time delay correction value k and the uplink transmission information, and sends the mapping table to the terminal for storing; when the service type reported by the terminal is received, selects information used by the uplink transmission from the mapping table according to the service type, and informs the terminal through the UL grant signaling; or
receives the service type reported by the terminal, and determines the time length of the single transmission time interval t and the time delay correction value k according to the service type, sends the determined time length of the single transmission time interval t, the time delay correction value k and the uplink transmission information to the terminal through a radio resource control signaling; or
after the base station determines the time length of the single transmission time interval t, the time delay correction value k and the uplink transmission information, indicates taking values of the time length of the single transmission time interval t, the time delay correction value k and the uplink transmission information through a bit sequence of downlink control information in the UL grant signaling for the terminal, the terminal pre-storing a mapping relation table of the bit sequence of the downlink control information, the time length of the single transmission time interval t, the time delay correction value k and the uplink transmission information.

17. A non-transitory storage medium having stored thereon instructions that, when executed by a processor of a base station, causes the processor of the base station to perform an uplink transmission method, the uplink transmission method comprising:
determining, by the base station, a time length of a single transmission time interval t and a time delay correction value k corresponding to a service type, according to a transmitted service type, the single transmission time interval t being equal to $2^n*5^m$ ms, m and n being integers, and k being an integer that is larger than or equal to −4;
sending uplink (UL) grant signaling to a terminal, and indicating uplink transmission information of uplink data in the UL grant signaling, the uplink transmission information comprising time for sending the uplink data the first time and a number of time for sending the uplink data, or the uplink transmission information comprising the time for sending the uplink data for the first time, the number of time for sending the uplink data and a time interval between every two times for sending the uplink data;
informing the terminal of duration information of the single transmission time interval t, information of the time delay correction value k and the uplink transmission information; and
receiving the uplink data transmitted by the terminal according to the duration information of the single transmission time interval t, the information of the time delay correction value k and the uplink transmission information, to implement an uplink transmission.

18. The non-transitory storage medium according to claim 17, wherein:
when the service type is a Long Term Evolution (LTE) service using a licensed frequency spectrum, a first uplink scheduling time delay is $T1=(4+k)*t$, t being equal to 1 ms, and k being larger than or equal to 0;
when the service type is an LTE service using an unlicensed spectrum, a second uplink scheduling time delay is $T2=(4+k)*t$, t being equal to 1 ms, k being larger than or equal to 0 and k being smaller than or equal to 7;
when the service type is an enhanced Mobile BroadBand (eMBB) service, a third uplink scheduling time delay is $T3=(4+k)*t$, t being smaller than or equal to 1 ms, and k being smaller than or equal to 0;
when the service type is an Ultra-Reliable and Low Latency Communications (URLLC) service, a fourth uplink scheduling time delay is $T4=(4+k)*t$, t being smaller than 1 ms, k being smaller than or equal to 0, and T4 being smaller than T3;
when the service type is a massive Machine Type Communications (mMTC), a fifth uplink scheduling time delay is $T5=(4+k)*t$, t being larger than or equal to 2 ms, and k being larger than or equal to 0.

19. The non-transitory storage medium according to claim 17, wherein sending the UL grant signaling to the terminal, and indicating the uplink transmission information of the uplink data in the UL grant signaling, comprises:

determining a number of time for sending the uplink data;

when the number of time for sending the uplink data is more than one, determining whether a plurality of consecutive sending time is occupied for sending the uplink data;

when the plurality of consecutive sending time is occupied, carrying the time for sending the uplink data the first time and the number of time for sending the uplink data in the UL grant signaling, sending the UL grant signaling to the terminal;

when a plurality of non-consecutive sending time is occupied, carrying the time for sending the uplink data the first time, the number of time for sending the uplink data and the time interval between every two times for sending the uplink data in the UL grant signaling, sending the UL grant signaling to the terminal.

20. The non-transitory storage medium according to claim 19, wherein the uplink transmission method further comprises:

when the number of time for sending the uplink data is one, carrying the time for sending the uplink data and the number of time for sending the uplink data in the UL grant signaling, and sending the UL grant signaling to the terminal.

* * * * *